US011656921B2

(12) United States Patent
Cheung et al.

(10) Patent No.: US 11,656,921 B2
(45) Date of Patent: *May 23, 2023

(54) METHOD FOR COMBINING UNIFIED MATTERS IN PERSONAL WORKSPACE AND SYSTEM USING THE SAME

(71) Applicant: ABLE WORLD INTERNATIONAL LIMITED, Tortola (VG)

(72) Inventors: Wai-Tung Cheung, Hong Kong (HK); Chun-Hsiao Lin, New Taipei (TW); Ho-Cheung Cheung, Hong Kong (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,191

(22) Filed: Apr. 27, 2022

(65) Prior Publication Data

US 2022/0253343 A1 Aug. 11, 2022

Related U.S. Application Data

(63) Continuation of application No. 15/640,866, filed on Jul. 3, 2017, now Pat. No. 11,360,828, which is a
(Continued)

(51) Int. Cl.
| | |
|---|---|
| *G06F 9/54* | (2006.01) |
| *G06F 9/48* | (2006.01) |
| *G06F 3/0486* | (2013.01) |
| *G06F 16/27* | (2019.01) |
| *H04L 51/56* | (2022.01) |

(52) U.S. Cl.
CPC .............. *G06F 9/54* (2013.01); *G06F 3/0486* (2013.01); *G06F 9/4806* (2013.01); *G06F 16/27* (2019.01); *H04L 51/56* (2022.05)

(58) Field of Classification Search
None
See application file for complete search history.

(56) References Cited

U.S. PATENT DOCUMENTS

| | | | |
|---|---|---|---|
| 2002/0054084 A1* | 5/2002 | Udell | G06F 16/957 707/E17.119 |
| 2006/0230124 A1* | 10/2006 | Belfiore | G06F 16/958 709/219 |

(Continued)

OTHER PUBLICATIONS

Berezovskiy et al., "A framework for dynamic data source identification and orchestration on the Web," Dec. 1, 2010, ACM. (Year: 2010).*

*Primary Examiner* — Qing Chen

(57) ABSTRACT

A method for combining unified matters in a personal workspace and a system using the method are provided. The method includes the following steps. Firstly, at least one matterizer is provided to the personal workspace, wherein at least one unified information unit corresponding to at least one original information and/or at least one unified tool corresponding to at least one original tool is acquired from at least one information source via the at least one matterizer. Then, the at least one unified information unit and/or the at least one unified tool is provided to the personal workspace via the at least one matterizer. Then, through the at least one unified tool and/or the at least one unified information unit, a task is performed.

18 Claims, 9 Drawing Sheets

Related U.S. Application Data continuation-in-part of application No. 14/325,466, filed on Jul. 8, 2014, now Pat. No. 9,727,391.

(56) References Cited

U.S. PATENT DOCUMENTS

| | | | | |
|---|---|---|---|---|
| 2007/0113066 A1* | 5/2007 | Samba | G06F 8/61 | 713/1 |
| 2009/0192847 A1* | 7/2009 | Lipkin | G06F 21/6236 | 726/4 |
| 2009/0300653 A1* | 12/2009 | Kukura | H04L 9/40 | 719/330 |
| 2012/0030689 A1* | 2/2012 | Li | G06F 9/541 | 719/318 |
| 2012/0216125 A1* | 8/2012 | Pierce | G06Q 10/103 | 715/744 |
| 2014/0007261 A1* | 1/2014 | Pandey | H04L 63/08 | 726/28 |
| 2014/0024348 A1* | 1/2014 | Hurst | H04M 3/5232 | 455/414.1 |
| 2014/0068589 A1* | 3/2014 | Barak | G06F 9/445 | 717/176 |
| 2014/0123020 A1* | 5/2014 | Bleier | G06F 8/38 | 715/746 |
| 2014/0157173 A1* | 6/2014 | Takayama | G06F 9/44505 | 715/771 |
| 2014/0237020 A1* | 8/2014 | Schachtel | G06F 9/4445 | 709/203 |
| 2014/0237375 A1* | 8/2014 | Schachtel | G06F 16/9038 | 715/741 |

* cited by examiner

METHOD FOR COMBINING UNIFIED MATTERS IN PERSONAL WORKSPACE AND SYSTEM USING THE SAME

CROSS-REFERENCE TO RELATED APPLICATION

This application is a continuation application of U.S. patent application Ser. No. 15/640,866 (now U.S. Pat. No. 11,360,828), filed on Jul. 3, 2017, which is a continuation-in-part application of U.S. patent application Ser. No. 14/325,466 (now U.S. Pat. No. 9,727,391), filed on Jul. 8, 2014. The contents of each of the aforementioned applications are hereby incorporated by reference in their entireties.

FIELD OF THE INVENTION

The present invention relates to a method for combining unified matters in a personal workspace and a system using the method.

BACKGROUND OF THE INVENTION

Currently, many websites, operation systems or applications are rapidly developed and become increasingly popular. These websites, systems and applications provide convenience and changes for users but also bring problems to the users because they are independent and incompatible with one another. In other words, the software vendors individually develop websites, systems or applications which do not share a unified mechanism. As a result, different operation systems and applications cannot cooperatively operate even with respect to data or tasks of the same class. Therefore, the users need to open many working interfaces of the applications and use specific functions or services of them for performing a task at present. Since there is no unified workspace to integrate these applications, it is complicated, inefficient and even infeasible for the users to perform the task.

For example, a user can use Photoshop or PhotoImpact to complete an image processing task. PhotoImpact provides a simple module for the user to easily process an image, and Photoshop provides a professional tool for advanced processing. If the user wants to apply a specific function or tool of Photoshop and a specific function or tool of PhotoImpact to process the image at the same time, the user needs to respectively operate Photoshop and PhotoImpact at present. Although these two applications can be applied in the same operation system, the tools of PhotoImpact are not allowed to be applied into the interface of Photoshop. In general, the tools or functions of the current applications are unable to be applied mutually. The user cannot use a single working environment or workspace to access or apply all of the functions or services of these applications. Therefore, the independence and incompatibleness of these websites, operation systems and applications block the freedom of the data/information exchange and the utilization of the functions or tools.

At present, a user can obtain much data or information from different information sources such as website, cloud storage, or computer device. These information sources have standalone operation interfaces, respectively. Therefore, these data or information are restricted by these standalone interfaces and are not easy or free for the user to transfer, access, or integrate. In the above situation, it is troublesome for the user in performing the work to process data or information which are scattered in various information sources. For this reason, the user may need a workspace to unify these data or information from the different information sources, and to provide an interface to integrate and process these data or information efficiently.

In addition, the updated software versions in the operation systems also make trouble to a user. Because a current operation system only permits one software version for each application, the user must choose one software version to use. Although the updated software provides a new and convenient function or service to the user, some users may still prefer to use the function or service of the old version because of some reasons (e.g., using habits). However most software vendors once provide the function or service of the new version, they will stop providing function or service of the old version. Therefore, the users are unable to freely choose the functions of the old versions they likes. Thus, the user needs a workspace which allows the collaborative operation of many services supported by different software versions.

Accordingly, what is needed is a unified workspace that permits any application or service of the different websites, operation systems or applications to be performed and provides a user with a free arrangement mechanism of these applications or services to create a personal working environment.

SUMMARY OF THE INVENTION

As mentioned above, the independence and incompatibleness of the websites, operation systems and applications block the freedom of the data/information exchange. For solving these drawbacks, the present invention provides a method for combining unified matters in a personal workspace and a system using the method.

In accordance with an aspect of the present invention, there is provided a system for combining unified matters in a personal workspace. The system includes a processing unit for arranging at least one information importer and at least one unified tool in a personal workspace via a unified script and providing at least one unified information unit to the personal workspace through the at least one information importer. Each unified information unit is produced by modeling an original information of a first information source with a first unified data model, and basic attributes of each unified information unit include a type of the original information and a link indicating where the original information is located. Each unified tool is produced by modeling an original tool of a second information source with a second unified data model, and basic attributes of each unified tool include a type of the original tool and a link indicating where the original tool is located. If the original tool is compatible with a working environment of the personal workspace, the corresponding unified tool is directly produced according to the type of the original tool and the link indicating where the original tool is located. If the original tool is incompatible with the working environment of the personal workspace, the unified tool is indirectly produced via an adapter and/or a software development kit (SDK) of the original tool to drive the original tool. The adapter provides an interface implementation compatible with the personal workspace. The processing unit accesses or controls the at least one unified information unit to perform a task through the at least one unified tool. When the at least one unified tool of the personal tool accesses or controls the at least one unified information unit to perform the task, the at least one corresponding original tool accesses or controls the at least one corresponding original information.

In an embodiment, the unified script is used as an intermediate language in the personal workspace.

In an embodiment, the at least one unified information unit includes at least one built-in unified information unit that is built in the personal workspace and/or at least one plugged-in unified information unit that is plugged in the personal workspace.

In an embodiment, the working environment of the personal workspace includes a microkernel to host the at least one information importer, the at least one unified information unit and/or the at least one unified tool.

In an embodiment, the microkernel provides the at least one information importer, the at least one unified information unit and/or the at least one unified tool to the personal workspace via the unified script, wherein the unified script is used as an intermediate language.

In an embodiment, the unified script is declared by a document type definition (DTD), an extensible markup language (XML) Schema, a structured language or a structured protocol.

In an embodiment, a preset unified tool for supporting the at least one unified information unit is chosen to access or control the at least one unified information unit by the processing unit according to the attributes of the at least one unified information unit via the personal workspace.

In an embodiment, when a specified unified information unit of the at least one unified information unit is dragged and dropped into the corresponding unified tool of the at least one unified tool, the specified unified information unit is accessible or controllable by the corresponding unified tool. Alternatively, when a specified unified tool of the at least one unified tool is dragged and dropped into the corresponding unified information unit of the at least one unified information unit, the corresponding unified information unit is accessible or controllable by the specified unified tool.

In an embodiment, each of the first information source and the second information source includes an internet service, a storage medium of a non-transitory computer or a storage medium of a mobile device, and/or the original information includes a file, a web page, a database row, a policy or a rule, and/or the original tool includes a utility, a widget, an intelligent agent, an application or a service.

In an embodiment, the at least one unified information unit includes a metadata of the at least one unified tool.

In accordance with another aspect of the present invention, there is provided a system for combining unified matters in a personal workspace. The system includes a processing unit for arranging at least one matterizer in a personal workspace and generating at least one unified information unit and at least one unified tool through the at least one matterizer. The at least one unified information unit and the at least one unified tool are hosted by a working environment of the personal workspace. The at least one matterizer acquires an attribute and an associated link of an original information from a first information source and models the original information into a corresponding unified information unit with a first unified data model by re-organizing the attribute and the associated link of the original information. The at least one matterizer acquires an attribute and an associated link of an original tool from a second information source and models the original tool into the corresponding unified tool with a second unified data model by re-organizing the attributes and the associated link of the original tool. If the original tool is compatible with the working environment of the personal workspace, the corresponding unified tool is directly produced according to the attribute and the associated link of the original tool. If the original tool is incompatible with the working environment of the personal workspace, the unified tool is indirectly produced via an adapter and/or a software development kit (SDK) of the corresponding original tool to drive the original tool. The adapter provides an interface implementation compatible with the personal workspace. The processing unit accesses or controls the at least one unified information unit to perform a task through the at least one unified tool. When the at least one unified tool of the personal tool accesses or controls the at least one unified information unit to perform the task, the at least one corresponding original tool accesses or controls the at least one corresponding original information.

In an embodiment, the at least one matterizer is arranged in the personal workspace by the processing unit via a unified script, and the unified script is used as an intermediate language in the personal workspace.

In an embodiment, the unified script is declared by a document type definition (DTD), an extensible markup language (XML) Schema, a structured language or a structured protocol.

In an embodiment, the personal workspace includes a microkernel, and the at least one matterizer, the at least one unified information unit and/or the at least one unified tool is provided to the personal workspace via a unified script, wherein the unified script is used as an intermediate language in the personal workspace.

In an embodiment, a preset unified tool for supporting the at least one unified information unit is chosen to access or control the at least one unified information unit by the processing unit according to the attributes of the at least one unified information unit via the personal workspace.

In an embodiment, when a specified unified information unit of the at least one unified information unit is dragged and dropped into the corresponding unified tool of the at least one unified tool, the specified unified information unit is accessible or controllable by the corresponding unified tool. Alternatively, when a specified unified tool of the at least one unified tool is dragged and dropped into the corresponding unified information unit of the at least one unified information unit, the corresponding unified information unit is accessible or controllable by the specified unified tool.

In an embodiment, each of the first information source and the second information source includes an internet service, a storage medium of a non-transitory computer or a storage medium of a mobile device, and/or the original information includes a file, a web page, a database row, a policy or a rule, and/or the original tool includes a utility, a widget, an intelligent agent, an application or a service.

In an embodiment, the at least one unified information unit includes a metadata of the at least one unified tool.

In accordance with another aspect of the present invention, there is provided a method for combining unified matters in a personal workspace. Firstly, at least one matterizer is provided to the personal workspace via a unified script. The at least one matterizer models a first original tool of a first information source into a first unified tool, so that basic attributes of the first unified tool include a type of the first original tool and a link indicating where the first original tool is located. The at least one matterizer models a second original tool of a second information source into a second unified tool, so that basic attributes of the second unified tool include a type of the second original tool and a link indicating where the second original tool is located. Then, the first unified tool and the second unified tool are provided to the personal workspace. The first original tool corresponding to the first unified tool and the second original tool corresponding to the second unified tool are integrated with a communication interface of a software development kit (SDK) that is provided by the personal workspace. When a task is performed through the first unified tool and the second unified tool in the personal workspace, the first original tool and the second original tool communicate with each other through the communication interface.

In an embodiment, the first original tool and the second original tool communicate with each other about an event content, a data content or a protocol content.

In an embodiment, the unified script is used as an intermediate language in the personal workspace.

In an embodiment the working environment of the personal workspace includes a microkernel to host the first unified tool and/or the second unified tool.

In an embodiment, the microkernel provides the first unified tool and the second unified tool to the personal workspace via the unified script, wherein the unified script is used as an intermediate language.

In an embodiment, the unified script is declared by a document type definition (DTD), an extensible markup language (XML) Schema, a structured language or a structured protocol.

In accordance with another aspect of the present invention, there is provided a method for combining unified matters in a personal workspace. Firstly, a matterizer is provided to the personal workspace via a unified script. The matterizer models an original tool of an information source into a unified tool, so that basic attributes of the unified tool include a type of the original tool and a link indicating where the original tool is located. Then, the unified tool is provided to the personal workspace via the matterizer. The unified tool includes a spontaneous driving unit. When the unified tool in the personal workspace is accessed or controlled, the spontaneous driving unit is enabled and the unified tool is automatically executed to perform a task.

In an embodiment, the unified script is used as an intermediate language in the personal workspace.

In an embodiment, a working environment of the personal workspace includes a microkernel to host the first unified tool and/or the second unified tool.

In an embodiment, the microkernel provides the unified tool to the personal workspace via the unified script, wherein the unified script is used as an intermediate language.

In an embodiment, the unified script is declared by a document type definition (DTD), an extensible markup language (XML) Schema, a structured language or a structured protocol.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
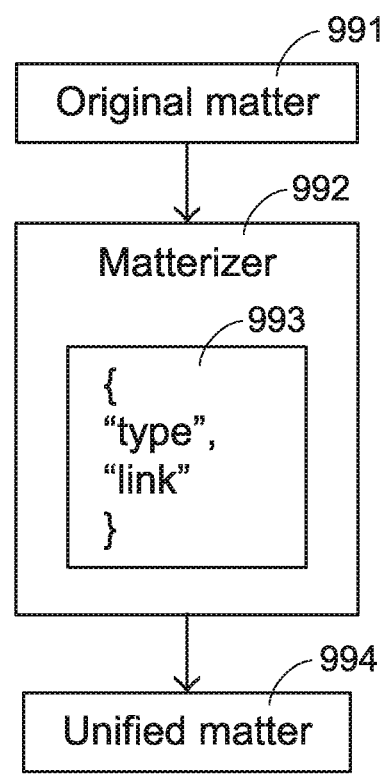
FIG. 1 is a schematic diagram illustrating an implementation concept of a unifying method according to an embodiment of the present invention.

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as a storage medium of a non-transitory computer or a storage medium of a mobile device). The term "original information" used herein is a file, a webpage, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The information sources for every two original information units may be identical or different. The information sources for every two original tools may be identical or different. The information source for any original information and the information source for any original tool may be identical or different. The one unified data model and another unified data model could be identical or different, and the unifying method described above could be completed through a matterizer.

Please refer to FIG. 1. FIG. 1 is a schematic diagram illustrating an implementation concept of a unifying method according to an embodiment of the present invention. As shown in FIG. 1, the matterizer 992 re-organizes an attribute and a link of an original matter 991 with a unified data model 993, and thus models the original matter 991 into a unified matter 994. Consequently, the basic attributes of the unified matter 994 include a type of the original matter 994 and a link indicating where the original matter 994 is located.

In this embodiment, the original matter 991 at least includes an original information (not shown) or an original tool (not shown), but is not limited thereto. The basic attributes of the unified information unit include a type of the original information and a link indicating where the original information is located. The basic attributes of the unified tool include a type of the original tool and a link indicating where the original tool is located. In the above unifying method, if the attributes accessible from the original information correspond to the attributes to be unified in the unified information unit, the unified information unit is directly produced through the matterizer 992. If the attributes accessible from the original information do not correspond to the attributes to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, which claims the benefit of priority to the U.S. patent application Ser. No. 14/324,069 and is entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modeled into a unified application program (i.e., the unified tool) compatible with the Android system so as to be executed in the Android system.

Figure 2:
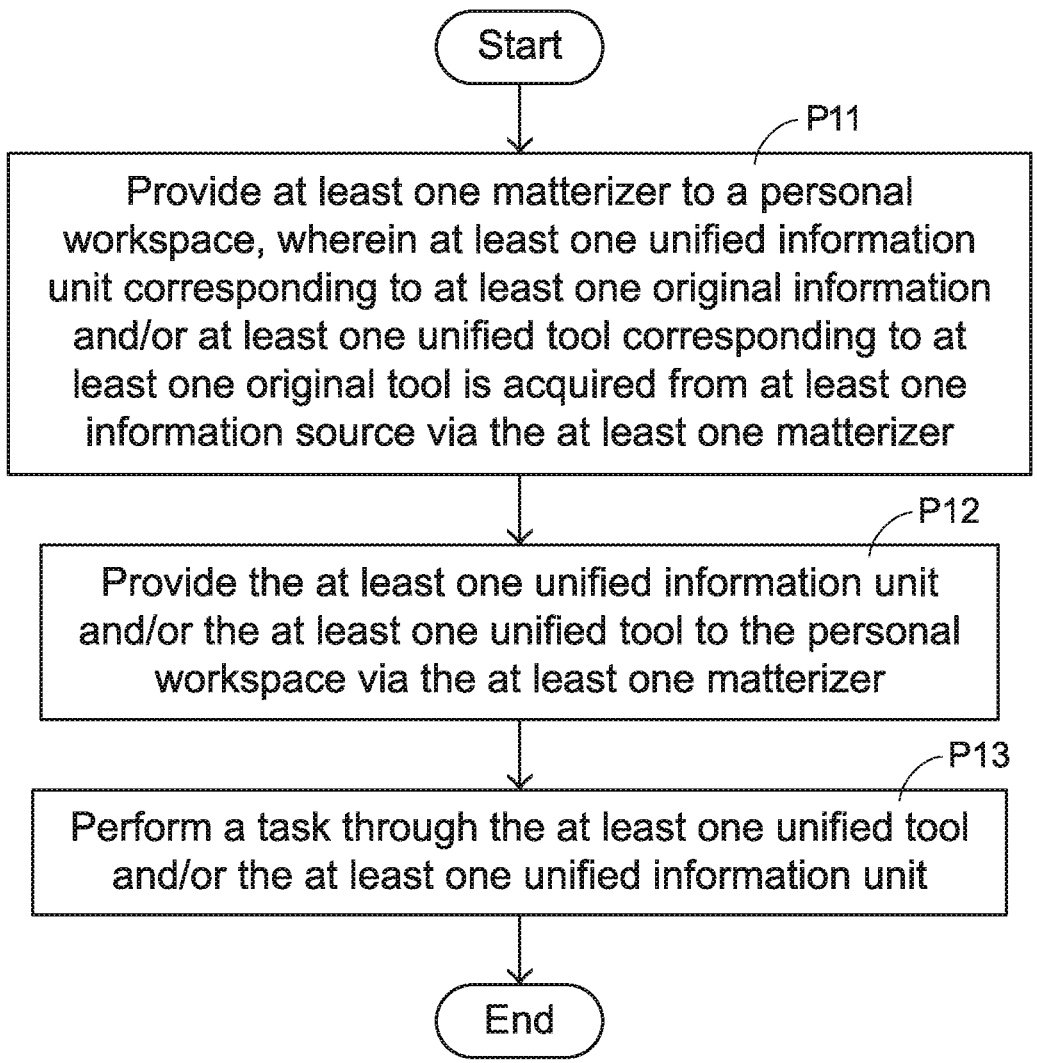
FIG. 2 is a flowchart illustrating a method for combining unified matters in a personal workspace according to a first embodiment of the present invention.

A method of providing a user-orientated personal workspace for a user will be illustrated as follows. FIG. 2 is a flowchart illustrating a method for combining unified matters in a personal workspace according to a first embodiment of the present invention. The method 100 comprises the following steps. In a step P11, at least one matterizer is provided to a personal workspace, wherein at least one unified information unit corresponding to at least one original information and/or at least one unified tool corresponding to at least one original tool is acquired from at least one information source via the at least one matterizer. In a step P12, the at least one unified information unit and/or the at least one unified tool is provided to the personal workspace via the at least one matterizer. In a step P13, a task is performed through the at least one unified tool and/or the at least one unified information unit.

First of all, a unified script as an intermediate language for realizing the present invention is edited. The matterizers with converting functions of different formations are allowed to be provided to (e.g., built in or plugged in) the unified script. The converting function can convert the original information from different information sources into the unified information unit and convert the original tool from different information sources into the unified tool. Preferably but not exclusively, the unified script is declared by a document type definition (DTD), an extensible markup language (XML) Schema, a structured language or a structured protocol. The matterizer can be implemented as Java Bean, COM, or any kind of pluggable component architecture. Hereinafter, information importers such as the information importer 23 of Dropbox 22 (see FIG. 3) and the information importer 26 of Google Drive 25 (see FIG. 3) and the information importer 33 (see FIG. 4) are some examples of the matterizer.

Moreover, according to different tasks, the at least one required unified information unit and/or the at least one required unified tool from the corresponding information source can be collected into the personal workspace. The unified information unit and/or the unified tool is obtained from a part or the entire of a plurality of information sources and then modeled. Moreover, the working environment of the personal workspace comprises a microkernel to host the matterizer, the unified information unit and the unified tool. The microkernel can provide the matterizer, the unified information unit or the unified tool to the projected workspace via the unified script.

Figure 3:
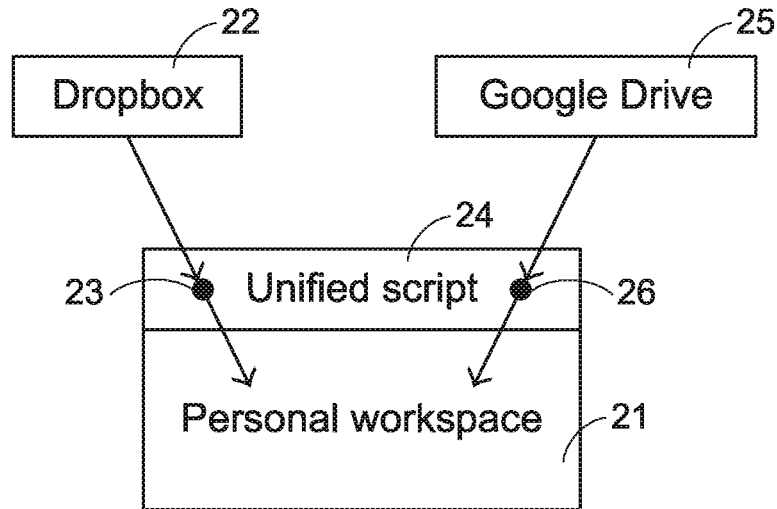
FIG. 3 is a schematic diagram illustrating an implementation concept of providing at least one matterizer to a personal workspace in the step P11 of FIG. 2 via a unified script.

FIG. 3 is a schematic diagram illustrating an implementation concept of providing at least one matterizer to a personal workspace in the step P1 of FIG. 2 via a unified script. As shown in FIG. 3, the unified script 24 is used as an intermediate language in the personal workspace 21. Moreover, the information importer 23 of Dropbox 22 and the information importer 26 of Google Drive 25 are configurable through the unified script 24. After a unifying process, the information importer 23 of Dropbox 22 and the information importer 26 of Google Drive 25 are allowed to enter together into the same personal workspace 21.

In this embodiment, the information source in the personal workspace 21 is Dropbox 22, and the information importer 23 of Dropbox 22 is a software component capable of unifying the information of Dropbox 22 into the unified information unit. The Dropbox matterizer is configurable through the unified script 24, and may be one of source providers for the personal workspace 21.

Moreover, another information source in the personal workspace 21 is Google Drive 25, and the information importer 26 of Google Drive 25 is a software component capable of unifying the information of Google Drive 25 into the unified information unit. Similarly, the Google Drive matterizer is configurable through the unified script 24, and may be one of source providers for the personal workspace 21.

As mentioned above, the required unified information units and/or the required unified tools from the corresponding information sources can be collected into the personal workspace according to different tasks. The original tools are classified into compatible tools and incompatible tools. If the original tool is the compatible tool, the original tool acquired from the at least one information source is directly provided to (e.g., built in or plugged in) the personal workspace via the unified script. Whereas, if the original tool is the incompatible tool, the original tool acquired from the at least one information source is indirectly provided to (e.g., built in or plugged in) the personal workspace via a compatible adapter and the unified script. Moreover, both of the compatible tool and the incompatible tool are regarded as unified tools.

Figure 4:
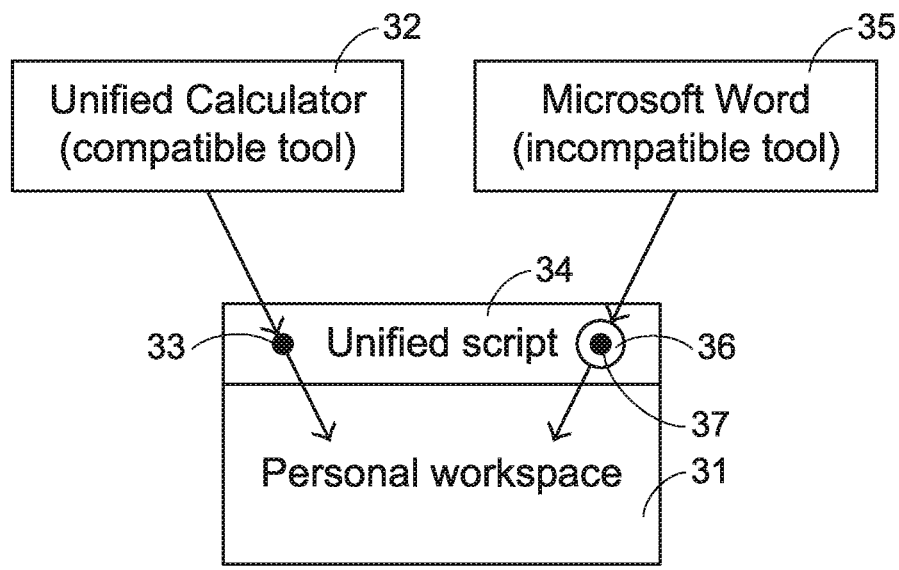
FIG. 4 is a schematic diagram illustrating an implementation concept of allowing the unified tool corresponding to the original tool to be provided to (e.g., built in or plugged in) the personal workspace in the step P12 of FIG. 2.

FIG. 4 is a schematic diagram illustrating an implementation concept of allowing the unified tool corresponding to the original tool to be provided to (e.g., built in or plugged in) the personal workspace in the step P12 of FIG. 2. First of all, the condition that the original tool is the compatible tool will be described. As shown in FIG. 4, one original tool is a Unified Calculator tool 32 in an information source. Since the component interface of the Unified Calculator tool 32 is compatible with the component architecture for the unified tool in a personal workspace 31, it is supposed that the Unified Calculator tool 32 is a compatible unified tool and the Unified Calculator tool 32 with a specific function is able to be directly provided to (e.g., built in or plugged in) a personal workspace 31 via a unified script (i.e., through an information importer 33).

Next, the condition that the original tool is the incompatible tool will be described. As shown in FIG. 4, another original tool is a Microsoft Word tool 35 in another information source. Since the component interface of the Microsoft Word tool 35 is incompatible with the component architecture for the unified tool in the personal workspace 31, an adapter 36 compatible with the component architecture for the unified tool in the personal workspace 31 is required. Then, the incompatible Microsoft Word tool 35 with a specific function is able to be directly provided to (e.g., built in or plugged in) a personal workspace 31 via a unified script (i.e., through a compatible information importer 36 and an information importer 37). As mentioned in FIG. 4, both of the compatible tool and the incompatible tool can be unified into the same personal workspace 31 in order to perform a specified task.

In an embodiment, the matterizer to be provided to the personal workspace is a built-in matterizer that is added to the personal workspace in a built-in manner, for example the matterizer that is previously edited into the unified script and added to the personal workspace during the process of opening the personal workspace (e.g., regarded as a preset matterizer). Alternatively, in another embodiment, the matterizer to be provided to the personal workspace is a plug-in matterizer that is added to the personal workspace in a plug-in manner, for example another matterizer that is added to the personal workspace through the preset matterizer after the personal workspace is opened. In particular, in an embodiment, any matterizer can be regarded as a unified tool. That is, the matterizer is present in the personal workspace in the form of the unified tool.

Similarly, the unified information unit to be provided to the personal workspace is a built-in unified information unit that is added to the personal workspace in a built-in manner, for example the unified information unit that is previously edited into the unified script and added to the personal workspace during the process of opening the personal workspace (e.g., regarded as a preset unified information unit and provided to the personal workspace through the corresponding matterizer). Alternatively, the unified information unit to be provided to the personal workspace is a plug-in unified information unit that is added to the personal workspace in a plug-in manner, for example the unified information unit that is added to the personal workspace through the corresponding matterizer after the personal workspace is opened.

Similarly, the unified tool to be provided to the personal workspace is a built-in unified tool that is added to the personal workspace in a built-in manner, for example the unified tool that is previously edited into the unified script and added to the personal workspace during the process of opening the personal workspace (e.g., regarded as a preset unified tool and provided to the personal workspace through the corresponding matterizer). Alternatively, the unified tool to be provided to the personal workspace is a plug-in unified tool that is added to the personal workspace in a plug-in manner, for example the unified tool that is added to the personal workspace through the corresponding matterizer after the personal workspace is opened.

In another embodiment, before the step P11 of FIG. 2, the method further comprises a step of providing the at least one unified information unit and/or the at least one unified tool to a built-in information source of the at least one information source. The above unified script is an example of the built-in information source. Consequently, the unified information unit provided to the unified script before the step P11 is regarded as the built-in unified information unit (or the preset unified information unit), and the unified tool provided to the unified script before the step 110 is regarded as the built-in unified tool (or the preset unified tool).

Moreover, the above unified information unit may include a metadata of the unified tool. The example of the metadata will be illustrated as follows. It is noted that example of the metadata is not restricted. For example, via the matterizer 992 of FIG. 1 (corresponding to the information importer 33 of FIG. 4), the Unified Calculator tool 32 of FIG. 4 is modeled to the following profile according to a unified data model 993 thereof. This profile may be regarded as the metadata of the unified tool corresponding to the Unified Calculator tool 32.

```
{
"type":"tool/widget",
"link":"The url to access Unified Calculator"
}
```

Moreover, any application program product shown on the APP store (Apple Computer, Inc.) before loading to the electronic device (e.g., a mobile phone or a tablet computer) of the user may be regarded as the metadata corresponding to the application program product.

In an embodiment, the personal workspace is equipped with a plurality of unified tools. Moreover, the functional feature provided by each unified tool can display or interpret a specified unified information unit. That is, after the at least one original tool is unified into the unified tool via the unified script, a task can be accomplished by using at least one unified tool to process the corresponding unified information unit. In addition, when discussing the representation of the unified tool of the present invention, a recognizable icon or a visible object can be used for remarking its operable function. An example of the unified tool includes but is not limited to a card icon, and each unified tool has a specific function.

Figure 5:
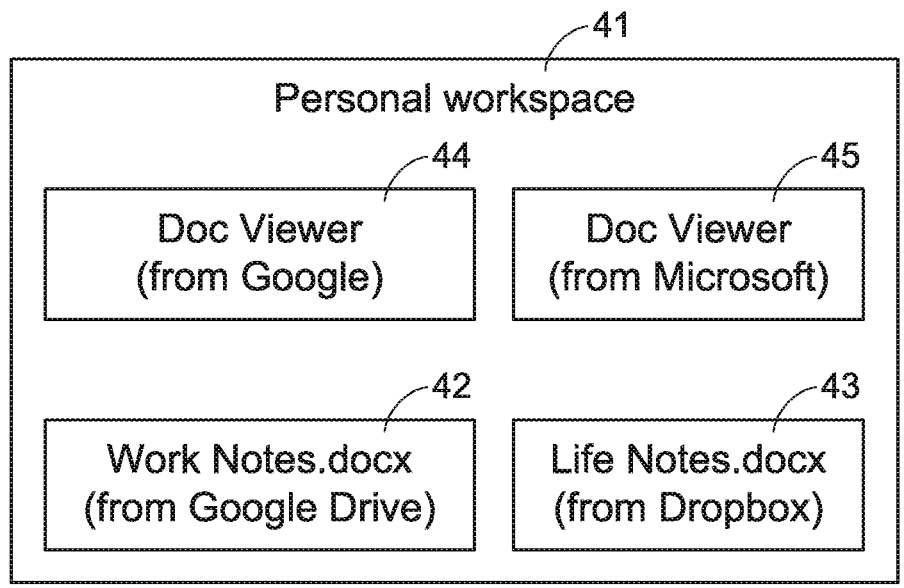
FIG. 5 is a schematic diagram illustrating an implementation concept of arranging the unified information units and the unified tools in the personal workspace according to an embodiment of the present invention.

In an embodiment, the unified information units and the unified tools added to the personal workspace can be arranged by the user. FIG. 5 is a schematic diagram illustrating an implementation concept of arranging the unified information units and the unified tools in the personal workspace according to an embodiment of the present invention. As shown in FIG. 5, the unified information units include Work Notes.docx 42 from Google Drive (i.e., an information source) and Life Notes.docx 43 from Dropbox (i.e., an information source), and the unified tools include a Doc Viewer tool 44 from Google (i.e., an information source) and a Doc Viewer tool 45 from Microsoft (i.e., an information source). Moreover, as shown in FIG. 5, the user groups and places the unified information units and the unified tools in a specific area of the personal workspace 41 in the arranging process.

Then, the step P13 of FIG. 2 will be illustrated. Moreover, according to the operational relationship between the unified tool and the unified information unit (e.g., the clicking or dragging actions between the two), the user can perform a specified task by using the unified tool to access or control the corresponding unified information unit. When the unified tool in the personal workspace accesses or controls the corresponding unified information unit to perform the specified task, the corresponding original tool accesses or controls the corresponding original information.

Figure 6:
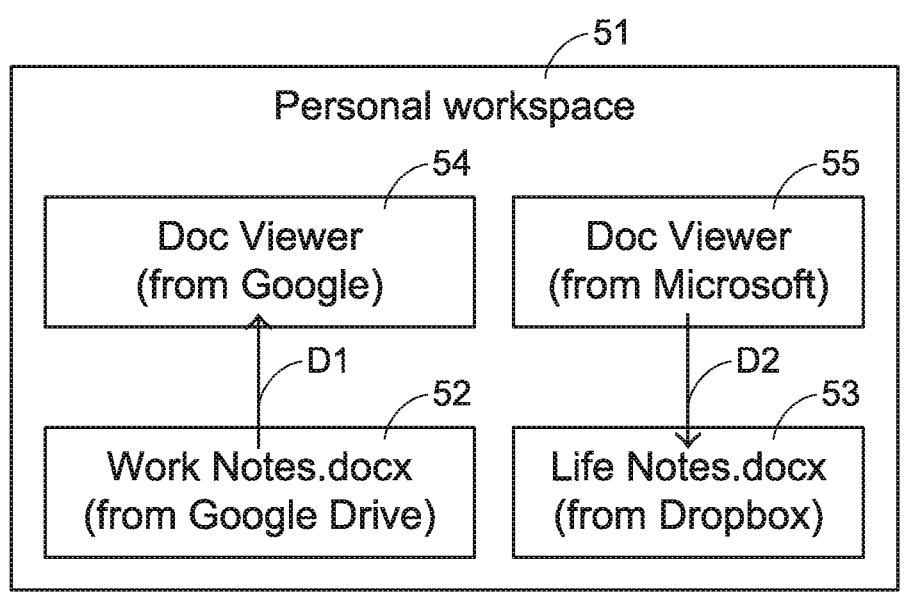
FIG. 6 is a schematic diagram illustrating an implementation concept of implementing the step P13 of FIG. 2.

Hereinafter, the process of implementing the step P13 of FIG. 2 will be illustrated with reference to FIG. 6. FIG. 6 also illustrates an implementation concept of processing the unified information unit with the unified tool and the interaction between the unified tool and the unified information unit according to an embodiment of the present invention. As shown in FIG. 6, the unified information units include Work Notes.docx 52 from Google Drive (i.e., an information source) and Life Notes.docx 53 from Dropbox (i.e., an information source), and the unified tools include a Doc Viewer tool 54 from Google (i.e., an information source) and a Doc Viewer tool 55 from Microsoft (i.e., an information source).

If the user intends to view at least one unified information unit (e.g., Work Notes.docx 52 from Google Drive and/or Life Notes.docx 53 from Dropbox), the corresponding unified tool (e.g., the Doc Viewer tool 54 from Google and/or the Doc Viewer tool 55 from Microsoft) is necessarily introduced into a personal workspace 51. Then, some view actions in the personal workspace 51 are thus associated with clicking or dragging actions.

The relationships between the view actions and the clicking actions will be illustrated as follows. In an embodiment, the user may directly click one unified information unit and select a supporting unified tool in the personal workspace 51 for viewing the clicked file upon the clicked file attribute. For example, if the user clicks Work Notes.docx 52 and selects the Doc Viewer tool 54 in the personal workspace 51, the user can view Work Notes.docx 52. In another embodiment, for viewing the expected original information, several dragging actions between the unified information unit and the unified tool can be set up.

The relationships between the view actions and the dragging actions will be illustrated as follows. In a first condition, the unified information unit to be accessed or controlled is dragged and dropped into the corresponding unified tool, so that the unified information unit is accessible or controllable. For example, after the user drags Work Notes.docx 52 and drops the same into the Doc Viewer tool 54 in the direction indicated by the arrow D1, the user can view Work Notes.docx 52. In a second condition, the unified tool for accessing or controlling the unified information unit is dragged and dropped into the unified information unit to be accessed or controlled, so that the unified information unit is accessible or controllable. For example, after the user drags Life Notes.docx 53 and drops the same into the Doc Viewer tool 55 in the direction indicated by the arrow D2, the user can view Life Notes.docx 53.

When the above unified tool (e.g., the Doc Viewer tool 54 from Google and/or the Doc Viewer tool 55 from Microsoft) accesses or controls the corresponding unified information unit (e.g., Work Notes.docx 52 from Google Drive and/or Life Notes.docx 53 from Dropbox), the corresponding original tool accesses or controls the corresponding original information. For example, the original tool includes a non-unified Doc Viewer tool in the Google server and/or a non-unified Doc Viewer tool in the Microsoft server, and the original information includes a non-unified Work Notes.docx in Google Drive and/or a non-unified Life Notes.docx in Dropbox.

In an embodiment, during the process of operating the personal workspace or during the process of performing the task, the user can add or delete at least one unified information unit in the personal workspace and/or load or unload at least one unified tool in the personal workspace so as to meet the user's requirement. Moreover, if any, the features of some unified tools and the unified information units can be combined into a software package. Thus, it is easier for the user to perform specific tasks, for example the tasks of searching/completing the contents of the files in a particular project.

Figure 7:
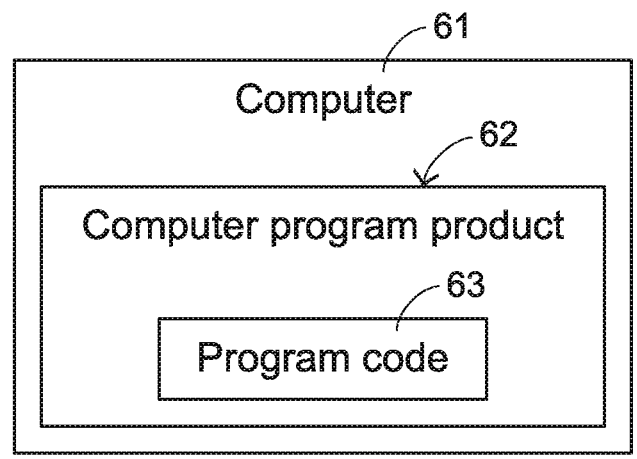
FIG. 7 is a schematic block diagram illustrating a computer program product using the method of FIG. 2.

FIG. 7 is a schematic block diagram illustrating a computer program product using the method of FIG. 2. For example, the computer program product 62 is a software package. The computer program product 62 is used for performing a task in a personal workspace. Moreover, the computer program product 62 contains a program code 63. The program code 71 can perform the method of FIG. 2 while the computer program product 7 is executed in a computer 6. The method comprises steps of allowing at least one matterizer, at least one unified information unit corresponding to at least one original information and/or at least one unified tool corresponding to at least one original tool to be provided to the personal workspace via a unified script, and performing a task by using the at least one unified tool and/or the at least one unified information unit. The implementations of these steps are similar to those mentioned above, and the detailed descriptions thereof are omitted.

Figure 8:
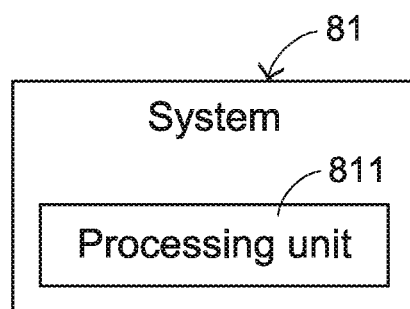
FIG. 8 is a schematic block diagram illustrating a system for performing the method of FIG. 2 according to an embodiment of the present invention.

FIG. 8 is a schematic block diagram illustrating a system for performing the method of FIG. 2. As shown in FIG. 8, the system 81 comprises a processing unit 811. The processing unit 811 is used for arranging at least one matterizer in a personal workspace and generating at least one unified information unit and at least one unified tool through the at least one matterizer. Moreover, the processing unit 811 uses the at least one unified tool to access or control the at least one unified information unit so as to perform a task. In an embodiment, each of the at least one matterizer is a built-in matterizer. Moreover, each of the at least one unified tool and each of the at least one unified information unit are plugged-in unified tool and plugged-in unified information unit that are plugged in the personal workspace through the at least one matterizer. The operations of the system 81 are similar to those mentioned above, and the detailed descriptions thereof are omitted.

Figure 9:
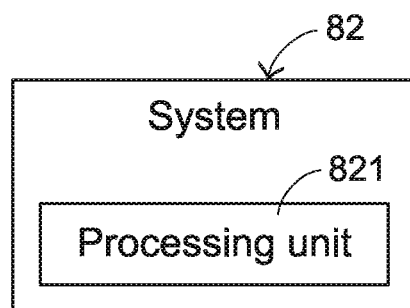
FIG. 9 is a schematic block diagram illustrating a system for performing the method of FIG. 2 according to another embodiment of the present invention.

FIG. 9 is a schematic block diagram illustrating a system for performing the method of FIG. 2 according to another embodiment of the present invention. The system 82 comprises a processing unit 821. The processing unit 821 is used for arranging at least one information importer and at least one unified tool in a personal workspace and providing at least one unified information unit to the personal workspace through the at least one information importer. Moreover, the processing unit 821 uses the at least one unified tool to access or control the at least one unified information unit so as to perform a task. In an embodiment, each of the at least one information importer is a built-in importer, and each of the at least one unified tool is a built-in unified tool. Moreover, each of the at least one unified information unit is a plugged-in unified information unit that is plugged in the personal workspace through the at least one information importer. The operations of the system 82 are similar to those mentioned above, and the detailed descriptions thereof are omitted.

Figure 10:
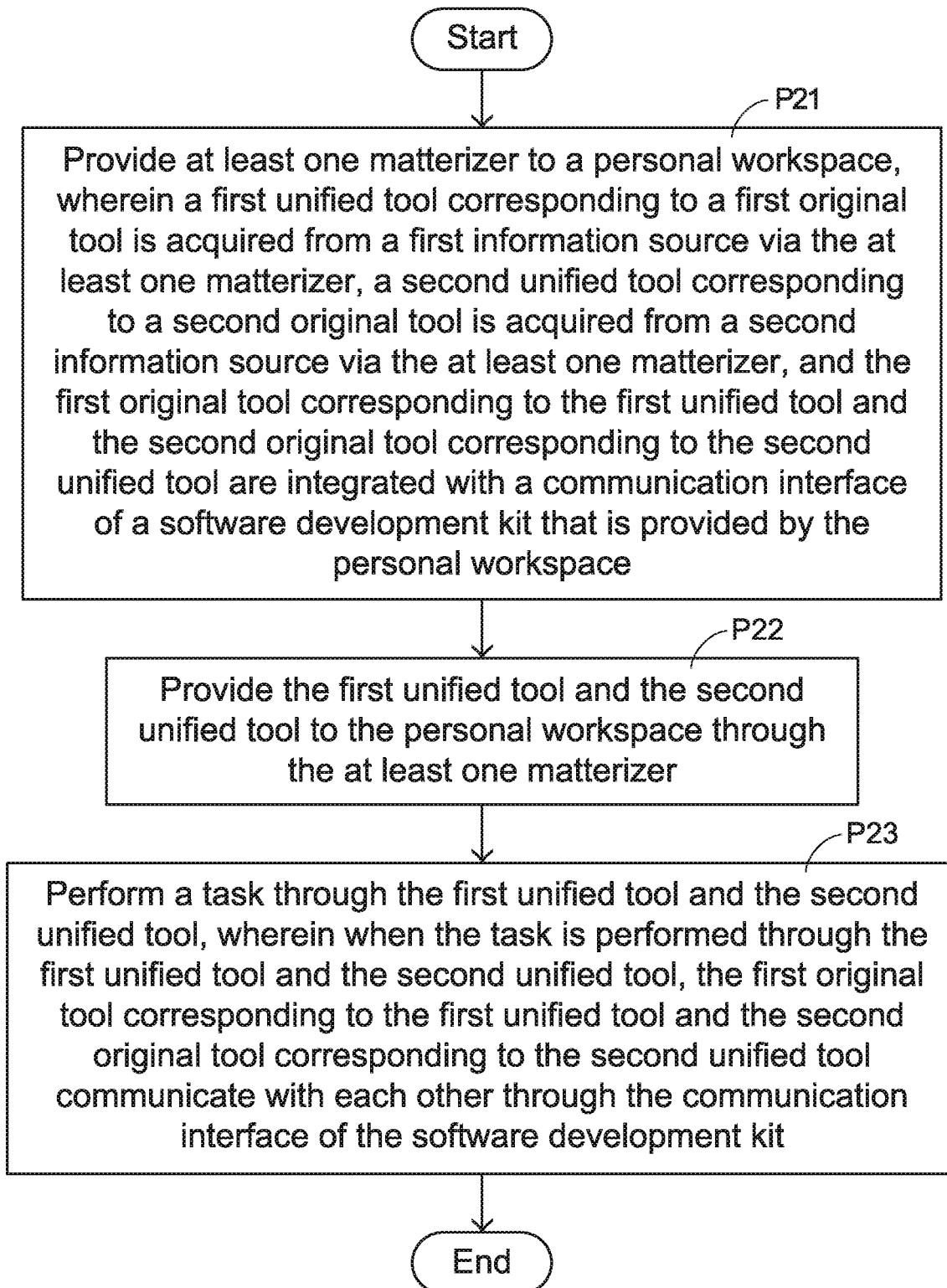
FIG. 10 is a flowchart illustrating a method for combining unified matters in a personal workspace according to a second embodiment of the present invention.

FIG. 10 is a flowchart illustrating a method for combining unified matters in a personal workspace according to a second embodiment of the present invention. The method 101 comprises the following steps. In a step P21, at least one matterizer is provided to a personal workspace, wherein a first unified tool corresponding to a first original tool is acquired from a first information source via the at least one matterizer, a second unified tool corresponding to a second original tool is acquired from a second information source via the at least one matterizer, and the first original tool corresponding to the first unified tool and the second original tool corresponding to the second unified tool are integrated with a communication interface of a software development kit (SDK) that is provided by the personal workspace. In a step P22, the first unified tool and the second unified tool are provided to the personal workspace through the at least one matterizer. In a step P23, a task is performed through the first unified tool and the second unified tool, wherein when the task is performed through the first unified tool and the second unified tool, the first original tool corresponding to the first unified tool and the second original tool corresponding to the second unified tool communicate with each other through the communication interface of the software development kit.

Figure 11:
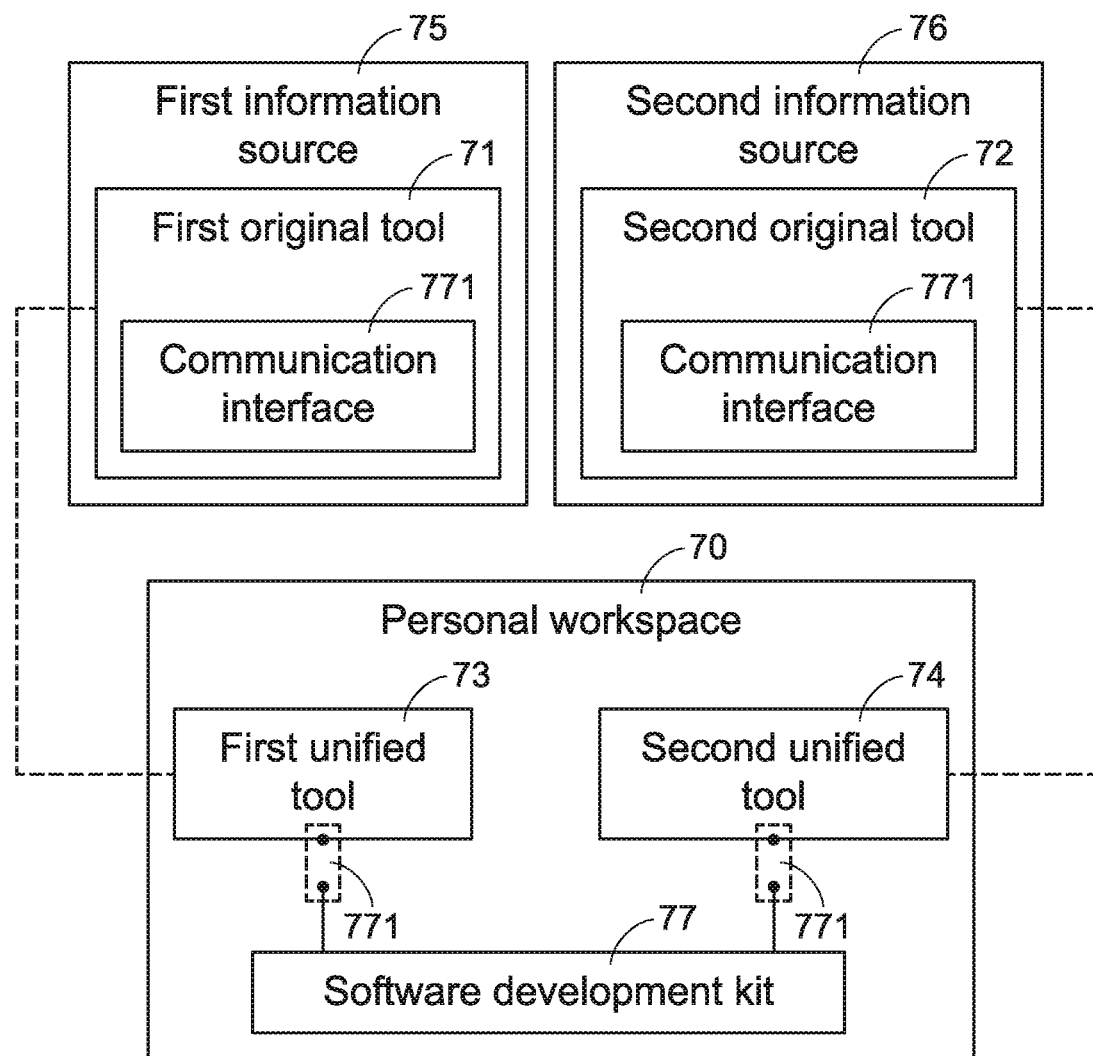
FIG. 11 is a schematic diagram illustrating an implementation concept of communicating the first original tool corresponding to the first unified tool with the second original tool corresponding to the second unified tool through the communication interface of the software development kit to perform a task in the method of FIG. 10.

FIG. 11 is a schematic diagram illustrating an implementation concept of communicating the first original tool corresponding to the first unified tool with the second original tool corresponding to the second unified tool through the communication interface of the software development kit to perform a task in the method of FIG. 10. As shown in FIG. 11, a first original tool 71 of a first information source 75 and a second original tool 72 of the second information source 76 are integrated with a communication interface 771 of a software development kit 77 that is provided by a personal workspace 70. Moreover, a first unified tool 73 corresponding to the first original tool 71 and a second unified tool 74 corresponding to the second original tool 72 are provided to the personal workspace 70 through at least one matterizer (not shown). For performing a task, the first unified tool 73 intends to communicate with the second unified tool 74 about an event content, a data content or a protocol content. Meanwhile, the event content, the data content or the protocol content is transmitted from the first unified tool 73 to the working environment of the personal workspace 70 through the communication interface 771. Then, the event content, the data content or the protocol content is transmitted from the working environment of the personal workspace 70 to the second unified tool 74 through the communication interface 771. In other words, when the task is performed through the first unified tool 73 and the second unified tool 74, the first original tool 71 corresponding to the first unified tool 73 and the second original tool 72 corresponding to the second unified tool 74 communicate with each other through the communication interface 771 of the software development kit 77.

In an embodiment, the working environment of the personal workspace 70 is implemented through html5. Moreover, for executing the first unified tool 73 and the second unified tool 74, an inline frame (iframe) in the working environment of the personal workspace 70 is opened. In the working environment of the personal workspace 70, the communication interface 771 of the software development kit 77 is used to exchange data between the first original tool 71, the second original tool 72 and the working environment through a PostMessage function. Moreover, the software development kit 77 also defines an exchange protocol for handling exchange process. Preferably but not exclusively, the exchange protocol defines the parameter format and the data format according to the exchange process of the communication interface.

While the first original tool 71 corresponding to the first unified tool 73 and the second original tool 72 corresponding to the second unified tool 74 are respectively loaded into two inline frames of the working environment of the personal workspace 70, the event content, the data content or the protocol content can be transmitted from the first original tool 71 to the second original tool 72. That is, the event content, the data content or the protocol content is packed with exchange protocol transmitted from the first unified tool 73 to the working environment of the personal workspace 70 through the communication interface 771 according to the exchange process of the communication interface 771. For example, the data is packed with the parameter format and data format defined by the exchange protocol and exchanged through the PostMessage function. Then, the event content, the data content or the protocol content is packed with exchange protocol and transmitted from the working environment of the personal workspace 70 to the second unified tool 74 through the communication interface 771 according to the exchange process of the communication interface 771. For example, the data is packed with the parameter format and data format defined by the exchange protocol and exchanged through the PostMessage function. Consequently, the second original tool 72 can receive the event content, the data content or the protocol content.

As mentioned above, the data exchange for the communication interface 771 of the software development kit 77 is implemented through the PostMessage function. Moreover, the working environment of the personal workspace 70 is used as a transfer medium of the event content, the data content or the protocol content. The transferring computation may be executed by the working environment or a specified software module of the working environment. Moreover, the data exchange and the exchange protocol/exchange process of the communication interface 771 of the software development kit 77 may be defined through texts, e.g., through a document. Alternatively, the communication interface 771 is provided through a library containing the complete implementation of the data exchange and the exchange protocol/exchange process to reduce complexity of system integration task. The above examples are presented herein for purpose of illustration and description only. In case that the working environment of the personal workspace 70 and the executing environment of the unified tool are different, the communication methods of the data exchange between the first unified tool 73, the second unified tool 74 and the working environment of the personal workspace 70 may be different. For example, the communication interface may be implemented through socket, android, intent, ios url scheme, or the like.

Figure 12:
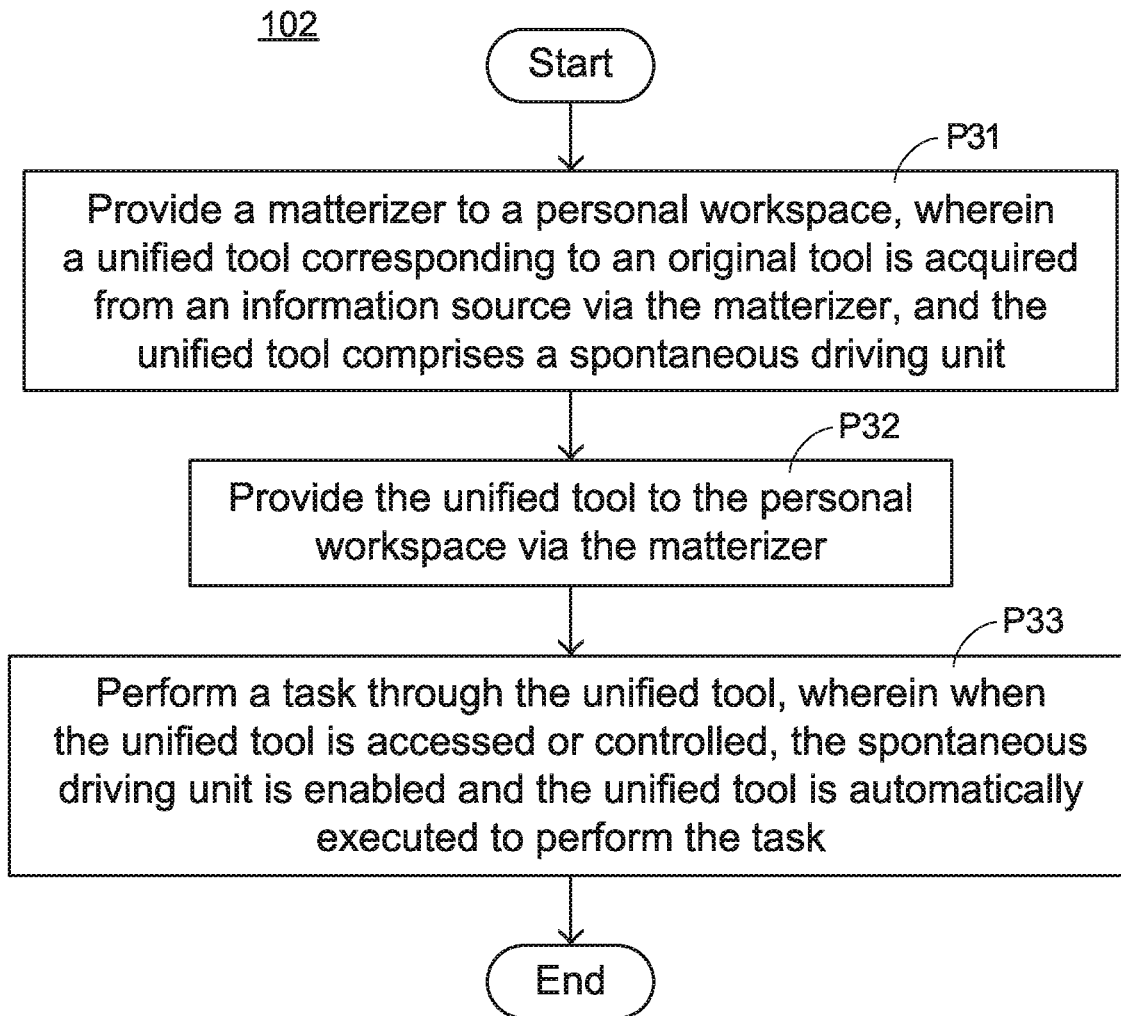
FIG. 12 is a flowchart illustrating a method for combining unified matters in a personal workspace according to a third embodiment of the present invention.

FIG. 12 is a flowchart illustrating a method for combining unified matters in a personal workspace according to a third embodiment of the present invention. The method 102 comprises the following steps. In a step P31, a matterizer is provided to a personal workspace, wherein a unified tool corresponding to an original tool is acquired from an information source via the matterizer, and the unified tool comprises a spontaneous driving unit. In a step P32, the unified tool is provided to the personal workspace via the matterizer. In a step P33, a task is performed through the unified tool, wherein when the unified tool is accessed or controlled, the spontaneous driving unit is enabled and the unified tool is automatically executed to perform the task.

Figure 13:
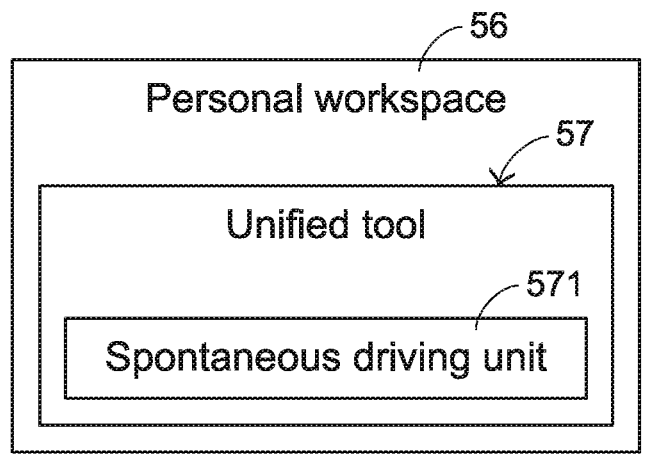
FIG. 13 is a schematic diagram illustrating a workspace for performing the method of FIG. 12 and a unified tool in the personal workspace.

FIG. 13 is a schematic diagram illustrating a workspace for performing the method of FIG. 12 and a unified tool in the personal workspace. As shown in FIG. 13, the unified tool 57 provided to the personal workspace 56 can be spontaneously driven. For example, the unified tool 57 is a tool with a game property. The unified tool 57 comprises a spontaneous driving unit 571. When the unified tool 57 is accessed or controlled (e.g., through a clicking action), the spontaneous driving unit 571 is enabled and the unified tool 57 is automatically executed.

Figure 14:
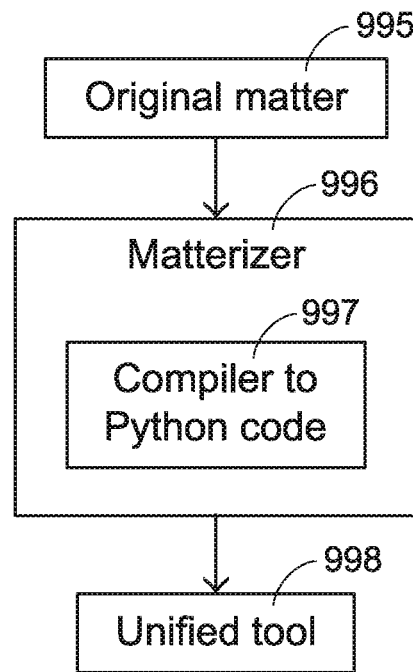
FIG. 14 is a schematic diagram illustrating an implementation concept of a unifying method according to another embodiment of the present invention.
Figure 15:
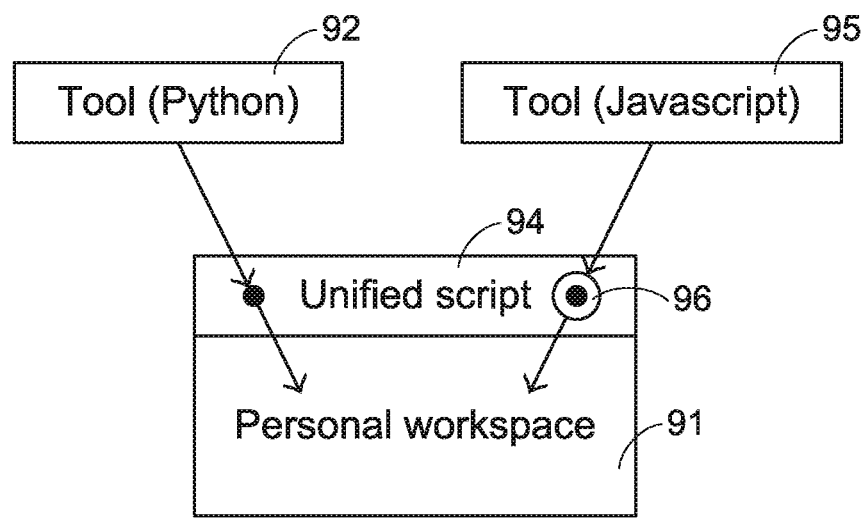
FIG. 15 is a schematic diagram illustrating an implementation concept of allowing the unified tool corresponding to the original tool to be provided to the personal workspace in the step P12 of FIG. 2 according to the unifying method of FIG. 14.

Another unifying method as shown in FIG. 14 will be illustrated as follows. The unified matter obtained by this unifying method can be also applied to the method of FIG. 2. Please refer to FIGS. 14 and 15. FIG. 15 is a schematic diagram illustrating an implementation concept of a unifying method according to another embodiment of the present invention. FIG. 14 is a schematic diagram illustrating an implementation concept of allowing the unified tool corresponding to the original tool to be provided to the personal workspace in the step P12 of FIG. 2 according to the unifying method of FIG. 14.

As shown in FIG. 14, an original tool 995 in any language is modeled into a unified tool 998 in a Python language via a matterizer 996 according to a unified data model 997. Consequently, the process of unifying the original tool 995 is completed. As shown in FIG. 15, the original tools include a tool 92 and a tool 95. The tool 92 is obtained from an information source and written in the Python language. The tool 95 is obtained from another information source and written in a Javascript language. A unified script 94 is written in the Python language. Consequently, any unified tool written in the Python language is compatible with the component architecture for the unified tool in a personal workspace 91. Since the tool 92 in the Python language is the compatible tool, the tool 92 in the Python language can be directly provided to the personal workspace 91 via the unified script 94. The tool 95 in the Javascript language is an incompatible tool. Consequently, after the tool 95 in the Javascript language is dynamically compiled as the Python structure via an adapter 96 compatible with the component architecture for the unified tool in a personal workspace 91, the tool 95 is provided to the personal workspace 91. As mentioned in FIG. 15, both of the compatible tool and the incompatible tool can be unified into the same personal workspace in order to perform a specified task.

From the above descriptions, the present invention provides a user-orientated unified personal workspace. The present invention has the following advantages.

Firstly, when compared with the conventional operating system, the personal workspace brings no boundary in sharing different information sources from internet. That is, the original information and the original tool from different information sources are respectively unified into a unified information unit and a unified tool in a personal workspace dedicated to a user, and the unified tool can be used to process the unified information unit for completing some specific tasks. Consequently, all of the original information and the original tools form different information sources will be used by the user in the personal workspace.

Secondly, the unified information unit and the unified tool in the personal workspace can be interactive. That is, the unified tool is allowed to process a corresponding unified information unit.

Thirdly, when an operating system is updated, other software may encounter incompatible problems causing inconveniences to the users. The users are forced to learn new operating system as well as the updated version of software. The present invention creates a personal workspace without new version update problem when compared with other operating systems.

Fourthly, the present invention provides a user-orientated personal workspace. That is, ideal unified information units or ideal unified tools are configured in the personal workspace according to the practical requirements of the user.

Fifthly, the personal workspace is able to access and control the multiple original informations from the different information sources.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A system for combining unified matters in a personal workspace, the system comprising a processing unit and a non-transitory storage medium having program code stored therein that, in response to execution by the processing unit, causes the system to at least:
    arrange a personal workspace that is provided with a matterizer, wherein a unified tool corresponding to an original tool from an information source is acquired via the matterizer, and wherein the unified tool is modeled from the original tool of the information source by the matterizer, such that attributes of the unified tool include a link indicating where the original tool of the information source is located;
    equip the unified tool to the personal workspace by representing the unified tool in the personal workspace as a recognizable icon or a visible object; and
    in response to an action of clicking or dragging on the recognizable icon or the visible object representing the unified tool in the personal workspace by a user, enable a spontaneous driving unit of the unified tool and automatically execute the unified tool to perform a task in the personal workspace.

2. The system according to claim 1, wherein an information unit is provided in the personal workspace, wherein a data model of the information unit contains a link indicating a location of an original information, and wherein the original information is located in another information source different from the information source.

3. The system according to claim 2, wherein when the information unit is dragged and dropped into the unified tool, the information unit is accessible or controllable by the unified tool.

4. The system according to claim 2, wherein when the unified tool is dragged and dropped into the information unit, the information unit is accessible or controllable by the unified tool.

5. The system according to claim 2, wherein the task in the personal workspace includes to display or interpret the information unit through the unified tool, and wherein the original information located in the other information source corresponding to the information unit is accessed or controlled by the original tool of the information source corresponding to the unified tool.

6. The system according to claim 2, wherein each of the information source and the other information source includes an internet service, a non-transitory storage medium of a computer, or a non-transitory storage medium of a mobile device, wherein the original information located in the other information source includes a file, a web page, a database row, a policy, or a rule, and wherein the original tool of the information source includes a utility, a widget, an intelligent agent, an application, or a service.

7. A non-transitory storage medium for combining unified matters in a personal workspace, the non-transitory storage medium having program code stored therein that, in response to execution by a processing unit, causes a system to at least:
    arrange a personal workspace that is provided with a matterizer, wherein a unified tool corresponding to an original tool from an information source is acquired via the matterizer, and wherein the unified tool is modeled from the original tool of the information source by the matterizer, such that attributes of the unified tool include a link indicating where the original tool of the information source is located;
    equip the unified tool to the personal workspace by representing the unified tool in the personal workspace as a recognizable icon or a visible object; and
    in response to an action of clicking or dragging on the recognizable icon or the visible object representing the unified tool in the personal workspace by a user, enable a spontaneous driving unit of the unified tool and automatically execute the unified tool to perform a task in the personal workspace.

8. The non-transitory storage medium according to claim 7, wherein an information unit is provided in the personal workspace, wherein a data model of the information unit contains a link indicating a location of an original information, and wherein the original information is located in another information source different from the information source.

9. The non-transitory storage medium according to claim 8, wherein when the information unit is dragged and dropped into the unified tool, the information unit is accessible or controllable by the unified tool.

10. The non-transitory storage medium according to claim 8, wherein when the unified tool is dragged and dropped into the information unit, the information unit is accessible or controllable by the unified tool.

11. The non-transitory storage medium according to claim 8, wherein the task in the personal workspace includes to display or interpret the information unit through the unified tool, and wherein the original information located in the other information source corresponding to the information unit is accessed or controlled by the original tool of the information source corresponding to the unified tool.

12. The non-transitory storage medium according to claim 8, wherein each of the information source and the other information source includes an Internet service, a non-transitory storage medium of a computer, or a non-transitory storage medium of a mobile device, wherein the original information located in the other information source includes a file, a web page, a database row, a policy, or a rule, and wherein the original tool of the information source includes a utility, a widget, an intelligent agent, an application, or a service.

13. A method for combining unified matters in a personal workspace, the method comprising:
    arranging a personal workspace that is provided with a matterizer, wherein a unified tool corresponding to an original tool from an information source is acquired via the matterizer, and wherein the unified tool is modeled from the original tool of the information source by the matterizer, such that attributes of the unified tool include a link indicating where the original tool of the information source is located;

equipping the unified tool to the personal workspace by representing the unified tool in the personal workspace as a recognizable icon or a visible object; and in response to an action of clicking or dragging on the recognizable icon or the visible object representing the unified tool in the personal workspace by a user, enabling a spontaneous driving unit of the unified tool and automatically executing the unified tool to perform a task in the personal workspace.

14. The method according to claim 13, wherein an information unit is provided in the personal workspace, wherein a data model of the information unit contains a link indicating a location of an original information, and wherein the original information is located in another information source different from the information source.

15. The method according to claim 14, wherein when the information unit is dragged and dropped into the unified tool, the information unit is accessible or controllable by the unified tool.

16. The method according to claim 14, wherein when the unified tool is dragged and dropped into the information unit, the information unit is accessible or controllable by the unified tool.

17. The method according to claim 14, wherein the task in the personal workspace includes to display or interpret the information unit through the unified tool, and wherein the original information located in the other information source corresponding to the information unit is accessed or controlled by the original tool of the information source corresponding to the unified tool.

18. The method according to claim 14, wherein each of the information source and the other information source includes an internet service, a non-transitory storage medium of a computer, or a non-transitory storage medium of a mobile device, wherein the original information located in the other information source includes a file, a web page, a database row, a policy, or a rule, and wherein the original tool of the information source includes a utility, a widget, an intelligent agent, an application, or a service.

* * * * *